United States Patent [19]

Hamabe

[11] 4,160,009
[45] Jul. 3, 1979

[54] BOILER APPARATUS CONTAINING DENITRATOR

[75] Inventor: Ko'hei Hamabe, Osaka, Japan

[73] Assignee: Hitachi Shipbuilding & Engineering Co., Ltd., Osaka, Japan

[21] Appl. No.: 815,722

[22] Filed: Jul. 14, 1977

[30] Foreign Application Priority Data

Jul. 27, 1976 [JP] Japan ................................. 51-89972
Jul. 27, 1976 [JP] Japan ........................... 51-100548[U]

[51] Int. Cl.² .......................... B01J 8/02; C01B 21/00
[52] U.S. Cl. ................................... 422/108; 122/4 D; 422/111; 422/114; 422/173; 422/177; 422/183; 422/188; 423/239
[58] Field of Search ... 23/288 F, 288 FA, 277 R (U.S. only), 23/262 (U.S. only); 423/239; 122/4 D; 165/35; 236/13 (U.S. only); 422/107 (U.S. only), 108 (U.S. only), 111 (U.S. only), 114 (U.S. only), 173 (U.S. only), 177 (U.S. only), 180 (U.S. only), 183 (U.S. only), 188 (U.S. only)

[56] References Cited

U.S. PATENT DOCUMENTS

| | | | |
|---|---|---|---|
| 2,905,523 | 9/1954 | Houdry et al. | 23/288 FC UX |
| 3,043,245 | 7/1962 | Hebert et al. | 23/288 F X |
| 3,159,450 | 12/1964 | Asker et al. | 23/288 F UX |
| 3,280,555 | 10/1966 | Charpentier et al. | 60/39.5 X |
| 3,679,372 | 7/1972 | Hartman, Jr. et al. | 23/288 FC UX |
| 4,003,711 | 1/1977 | Hishimurra et al. | 23/288 F |
| 4,012,488 | 3/1977 | Brocoff | 423/239 X |

Primary Examiner—Joseph Scovronek

[57] ABSTRACT

A boiler apparatus having a furnace and a plurality of heat exchanger stages disposed in a channel for the combustion gas discharged from the furnace. The boiler apparatus is equipped with a denitrator which utilizes a catalyst and which is disposed in the optimum reaction temperature region for the catalyst in the channel. In order to control the temperature of the combustion gas in the optimum reaction temperature region, this region is adapted to communicate with a high temperature gas source or a low temperature gas source through a control valve. Desirably, the portion of the combustion gas channel which includes the optimum reaction temperature region is divided into a plurality of systems and dampers whose opening and closing are controlled are provided upstream and downstream of the region.

9 Claims, 9 Drawing Figures

BOILER APPARATUS CONTAINING DENITRATOR

The present invention relates to a boiler apparatus, and more particularly it relates to a boiler apparatus containing a denitrator.

At present, the methods of reducing the concentration of nitrogen oxides ($NO_x$) in the exhaust gas produced by combustion within boiler apparatuses or initially contained in fuel gas are in two types, the combustion control method and the smoke gas denitration method. The present invention is concerned with the latter method, or the smoke denitration method, which removes the nitrogen oxides from the exhaust gas from a boiler apparatus, and more particularly it is concerned with a dry type denitration method. Of the dry type denitration methods, the one based on reaction with ammonia, as expressed by the following formula, is particularly effective.

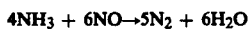

$$4NH_3 + 6NO \rightarrow 5N_2 + 6H_2O$$

Such reaction for denitration as exemplified by the formula is caused by the action of a catalyst and the properties of such catalyst are the most important factor. Optimum reaction temperatures for such catalysts mostly are within a range of 350°–500° C. On the other hand, the temperature of exhaust gas discharged from a boiler apparatus is about 200° C. Therefore, it has been a usual practice to subject the exhaust gas from a boiler apparatus exit to a denitrating action in a denitrating tower only after raising its temperature to said optimum reaction temperature.

More particularly, in a conventional boiler apparatus, as shown in FIG. 1, the untreated gas 2 exhausted from a boiler apparatus 1 is preheated with recovered heat by a gas-gas heat exchanger 3 and has its pressure raised by an exhaust gas fan 4 and then it is fed into a temperature raising furnace 5, where its temperature is raised to the optimum denitration gas temperature. The untreated gas 2 thus raised in temperature and pressure is fed into a denitration reactor 6, where the intended denitration is carried out, whereupon the denitrated treated gas 2A is fed into said gas-gas heat exchanger 3 for heat exchange and then discharged through a chimney 7. According to such conventional system, the untreated gas 2 from the boiler apparatus 1 is heated to the optimum reaction temperature and then subjected to a denitration action within the denitration reactor 6, so that the temperature raising furnace 5, a temperature control device (not shown), etc. are required, resulting in an increase in the cost of the entire apparatus.

Now, with attention paid to the fact that the untreated combustion gas flowing in a boiler apparatus passes such optimum reaction temperature region without exception, it may be contemplated to install a denitrator inside the boiler apparatus. Thus, as shown in FIG. 2, in a boiler apparatus 10, a denitrator 15 utilizing a catalyst is installed in an exhaust gas channel 14 from the upper furnace exit 12 of a furnace 11 to the exit 13 of the boiler apparatus 10 and in the optimum reaction temperature region for said catalyst, i.e., between a secondary economizer 16 and a primary economizer 17. Therefore, the untreated gas 20A from the furnace 11 is passed from superheaters 18 and 19 through the secondary economizer 16 into the denitrator 15, where it is subjected to the intended denitration, and the thus treated gas 20B is then passed from the primary economizer 17 through a gas-air heater 21 and discharged from a chimney 22. According to such boiler apparatus containing a denitrator, the parts associated with the denitrator such as those shown in FIG. 1 can be dispensed with by designing the two economizers 16 and 17 so as to assure that the gas passing through the denitrator 15 will attain a temperature optimum for denitration. On the other hand, however, the following problems would arise.

(a) In the case where the boiler apparatus is designed to be operated by burning heavy oil exclusively, while the intended denitration percentage can be achieved by installing the denitrator at a position where the optimum gas temperature exists, there may be cases where said boiler apparatus has to be operated by burning blast furnace gas (BFG) and/or coke oven gas (COG) singly or in addition to heavy oil, and in such cases, the gas temperature within the denitrator cannot always be expected to be the optimum denitration temperature, deviating from the allowable temperature range.

(b) Even in the case of using a single type of fuel, for local loads it sometimes occurs that the gas temperature in the denitrator deviates from the optimum allowable temperature range. In this case, the amount of $NO_x$ produced at the time of local loading can be neglected in some cases, but under some condition for use there are cases where it cannot be neglected.

(c) In order to secure the intended denitration percentage when the gas temperature greatly varies, it is necessary to pack a catalyst for denitration to some excess to provide against the worst conditions.

(d) Since the denitrator composed of denitrating catalyst layers is built in the boiler apparatus, it sometimes becomes necessary to stop the operation of the entire boiler apparatus because of the denitrator as in the case of washing the denitrating catalyst layers with water. This is not desirable from the standpoint of the rate of operation.

A principal object of the present invention is to provide a boiler apparatus containing a denitrator, wherein the above problems have been solved by providing means for controlling the temperature of the combustion gas in a region where said denitrator utilizing a catalyst is disposed.

Further, the invention, in its preferred embodiment, provides a boiler apparatus wherein said temperature control means comprises a source of gas having a temperature different from the temperature of the combustion gas in said region, and a control valve placed in a path for communication between said source of gas and said region. In this case, the temperature control of the combustion gas is quickly carried out, so that a stabilized denitration percentage is obtained at all times.

Also, the invention, in its further preferred embodiment, provides a boiler apparatus wherein said source of heat is the combustion gas which is present upstream of said region in said combustion gas channel. In this case no extra source of heat or gas is required, thus simplifying the facilities and saving the cost of operation.

Another object of the invention is to provide a boiler apparatus wherein at least the portion of the channel for the combustion gas from the boiler apparatus which includes said optimum temperature region is divided into a plurality of systems and dampers for opening and closing the respective divisional channels are provided upstream and downstream of the latter, so that the denitrating catalyst layers in the respective divisional channels can be successively washed with water without stopping the operation of the boiler apparatus by closing a particular divisional channel to be cleaned at a time while allowing the other divisional channel or channels to remain open.

The invention, in its preferred embodiment, provides a boiler apparatus wherein at the time of operating said control valve, the degree of opening of said dampers is adjusted in operative association therewith.

Other numerous features and effects of the invention will be readily understood from the following description of various embodiments of the invention given with reference to the accompanying drawings, in which.

Figure 1:
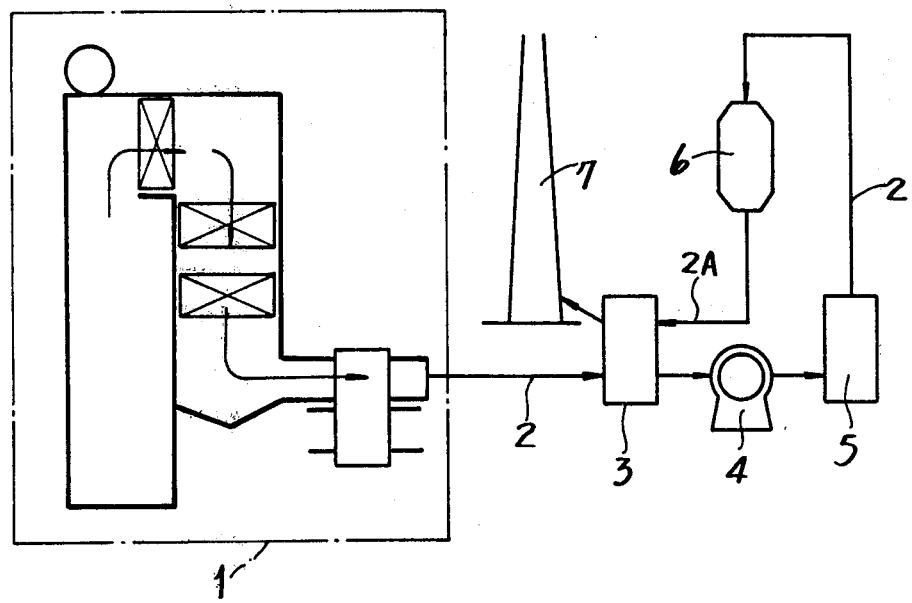
FIG. 1 is a longitudinal section schematically showing the arrangement of a conventional boiler apparatus.
Figure 2:
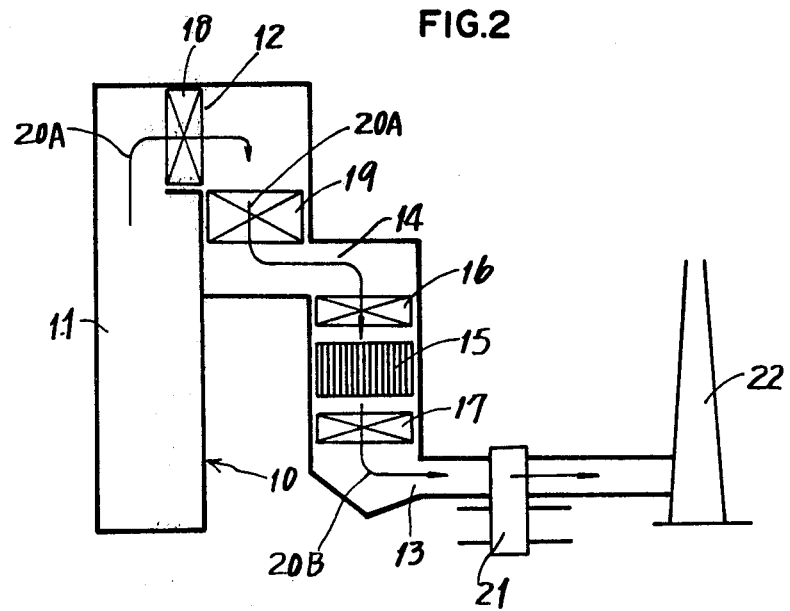
FIG. 2 is a longitudinal section schematically showing the arrangement of a boiler apparatus which forms the background of the invention.

A first embodiment of the invention will first be described with reference to FIG. 3.

In a boiler apparatus 30, a denitrator composed mainly of denitrating catalyst layers is installed in a combustion gas channel 34 from the upper furnace exit 32 of a furnace 31 to the exit 33 of the boiler apparatus 30 and in the optimum temperature distribution region for the catalyst, i.e., between a secondary economizer 36 and a primary economizer 37. The numeral 38 designates a superheater disposed at the upper furnace exit 32; 39, a superheater disposed between said superheater 38 and said secondary economizer 36; 41, a gas-air heater disposed outwardly of the exit 33; and 42 designates a chimney. Designated at 43 is temperature adjusting means for performing temperature control in the optimum reaction temperature distribution region, said means comprising a bypass channel 44 branching off from the exhaust gas channel 34 to establish communication between the upstream and downstream sides of said secondary economizer 36, a control valve 45 disposed in said bypass channel 44, and a control device 46 for opening and closing said control valve 45 by detecting the gas temperature between the secondary economizer 36 and the denitrating catalyst layers 35.

Therefore, the untreated gas 40A from the furnace 31 passes through the two superheaters 38, 39 and the secondary economizer 36 to reach the entrance of the denitrator 35. If the temperature of the untreated gas 40A is the temperature in the optimum reaction temperature distribution region, it is passed through the denitrator 35 and thereby denitrated, and the treated gas 40B flows from the primary economizer 37 toward the chimney 42. If, however, the temperature of the untreated gas 40A is lower than the temperature in the optimum reaction temperature distribution region, this is detected by the control device 46 and the control valve 45 is opened, whereby the untreated gas 40A, which is at high temperature prior to being passed to the secondary economizer 36, is fed to the entrance of the denitrator 35 through the bypass channel 44 and joins with the untreated gas 40A which has passed through the secondary economizer 36 to thereby raise the temperature of the latter untreated gas 40A. This temperature control is automatically performed, whereby the temperature of the untreated gas at the entrance is always the temperature in the optimum reaction temperature distribution region.

Figure 4:
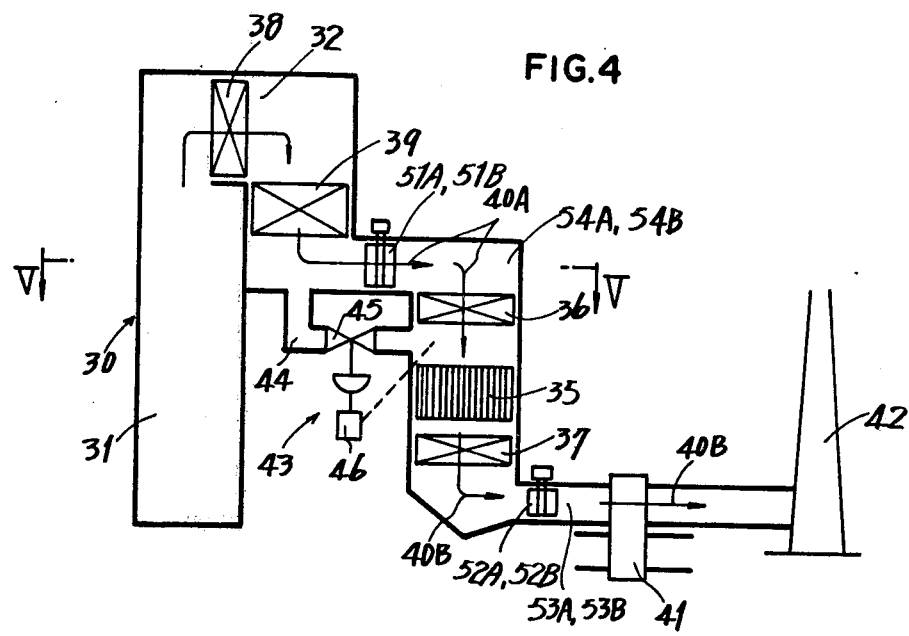
FIG. 4 is a longitudinal section schematically showing the arrangement of a second embodiment of the invention which is an improvement on said first embodiment.
Figure 5:
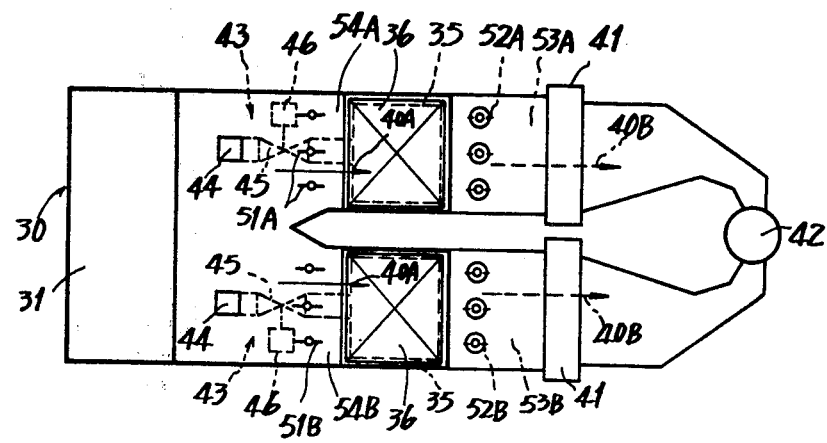
FIG. 5 is a plan view in section taken along the line V—V of FIG. 4.

FIGS. 4 and 5 show a second embodiment of the invention which is an improvement on said first embodiment. The same parts as those shown in the first embodiment are given the same reference numerals and a description thereof is omitted. The feature of this embodiment consists in the fact that at least the portion of the combustion gas channel 34 between the upper exit 32 of the furnace 31 and the exit 33 of the boiler apparatus in which said denitrator 35 is disposed is divided into a plurality of parts. In the illustrated embodiment, the area between the superheater 38 and the superheater 39 downstream thereof is a common combustion gas channel, but the area downstream thereof is divided into a plurality (two, in the illustrated example) of combustion gas channels 54A and 54B, in each of which there are disposed a secondary economizer 36, a denitrator 35, a primary economizer 37 and temperature control means 43. Further, the exits 53A and 53B of the channels 54A and 54B form the exit of the boiler apparatus 30 and are connected to the chimney 42 through respective gas-air heaters 41. At the entrances of the channels 54A and 54B, there are provided entrance dampers 51A and 51B, while at their exits, i.e., the boiler apparatus exits 53A and 53B there are provided exit dampers 52A and 52B.

Therefore, the untreated combustion gas 40A from the furnace 31 passes through the two superheaters 38 and 39 to reach the entrances of the two combustion gas channels 54A and 54B, where the gas stream branches off to flow through the separate secondary economizers 36 to reach the entrances of the denitrators 35, and it is denitrated as it is passed through the denitrators 35. The treated combustion gas 40B flows to the chimney 42 via the primary economizers 37 and gas-air heaters 41. During such ordinary denitrating operation, the dampers 51A, 51B and 52A, 52B are open and the combustion gas flows uniformly through the two gas channels 54A and 54B. By closing the dampers 51A, 52A or 51B, 52B of one gas channel 54A or 54B, it possible to prevent the gas flow in said one exhaust gas channel 54A or 54B. Therefore, by carrying out washing with water with respect to one combustion gas channel 54A or 54B whose gas flow is stopped, it is possible to carry out the cleaning of the denitrator and gas-air heater without stopping the gas flow in the other combustion gas channel 54B or 54A.

In addition, if the temperature of the combustion gas in the regions where the denitrators 35 are installed is lower than the optimum reaction temperature, adjustment is made in the manner described in the first embodiment, and in that case, by closing the entrance damper 51A or 51B to a suitable degree when the control valve 45 is opened, the rate of supply of combustion gas through the bypass channel 44 for the combustion gas 40A can be easily and positively adjusted and hence the temperature control is correspondingly facilitated.

Figure 3:
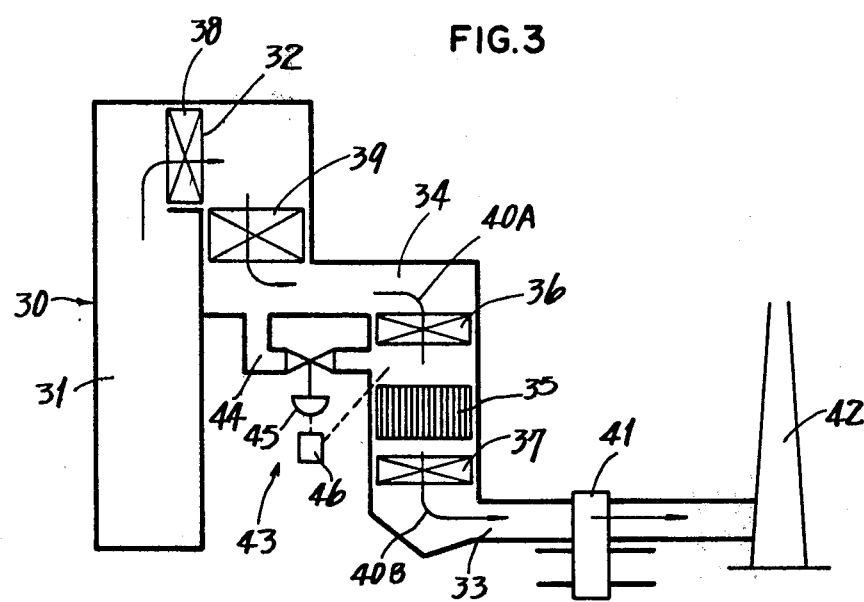
FIG. 3 is a longitudinal section schematically showing a boiler apparatus according to a first embodiment of the invention.
Figure 6:
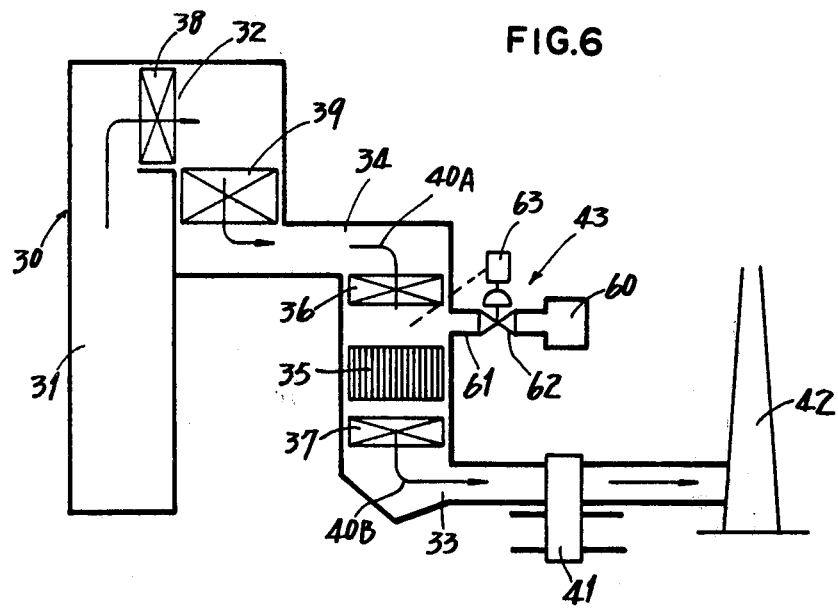
FIGS. 6 and 7 are longitudinal sections showing modifications equivalent to the first embodiment.

The boiler apparatus shown in FIG. 6 is substantially the same as the first embodiment shown in FIG. 3, the only difference being in the arrangement of the temperature adjusting means 43. Thus, the high temperature gas source in the temperature adjusting means 43 consists of a temperature raising furnace 60, and a duct 61 from the temperature raising furnace 60 establishes comminication between the secondary economizer 36 and the denitrator 35 and a control valve 62 placed in said duct 61 is operated by the control device 63.

Figure 7:
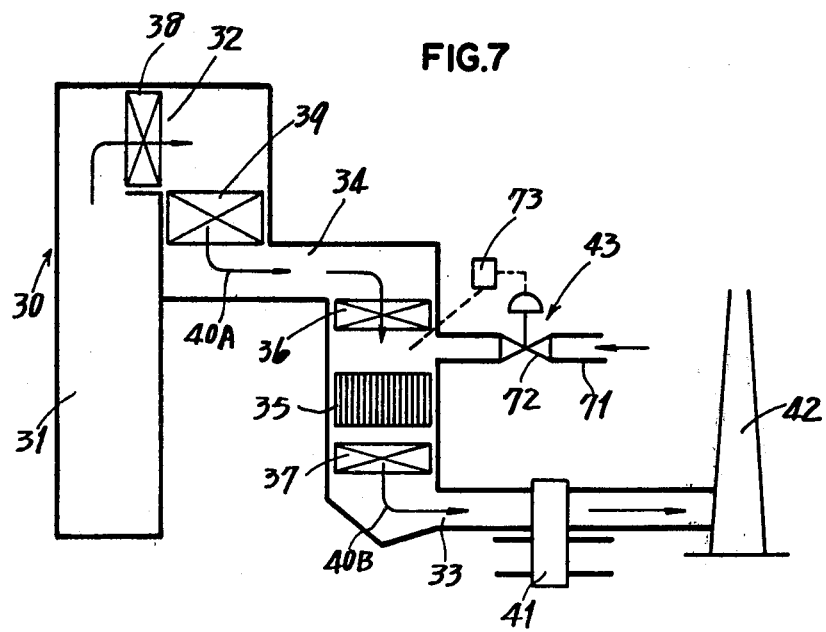

The boiler apparatus shown in FIG. 7 is also similar to that shown in FIG. 6, wherein the temperature adjusting means 43 comprises a low temperature fluid (such as air or other gas) supply duct 71 establishing communication between the secondary economizer 36 and the denitrator 35, and a control valve 72 placed in said duct 71 and adapted to be operated by the control device 73.

Figure 8:
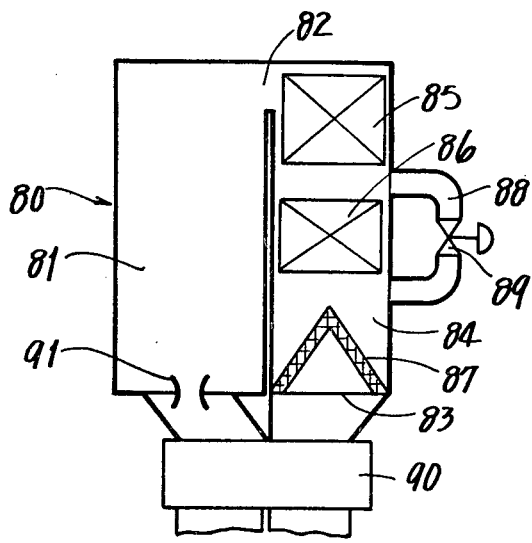
FIG. 8 is a longitudinal section showing a third embodiment of the invention.

FIG. 8 shows an example of a modification of the arrangement of the boiler apparatus itself and denitrator. A boiler apparatus 80 comprises a furnace 81, a superheater 85 and a preheater 86 which are disposed in a combustion gas channel 84 between an upper furnace exit 82 and a boiler exit 83. A denitrator 87 is disposed adjacent the exit 83 downstream of the preheater 86. A bypass channel 88 for establishing communication between the upstream and downstream sides of the preheater 84, and a control valve 89 for opening and closing said bypass channel 88 are provided for controlling the combustion gas temperature at the position of the denitrator 87. The denitrator 87 consists of a denitrating catalyst layer which is inverted V-shaped in cross section to increase the cross-sectional area of the path of the combustion gas. Designated at 90 is a gas-air heater and 91 is a burner.

Figure 9:
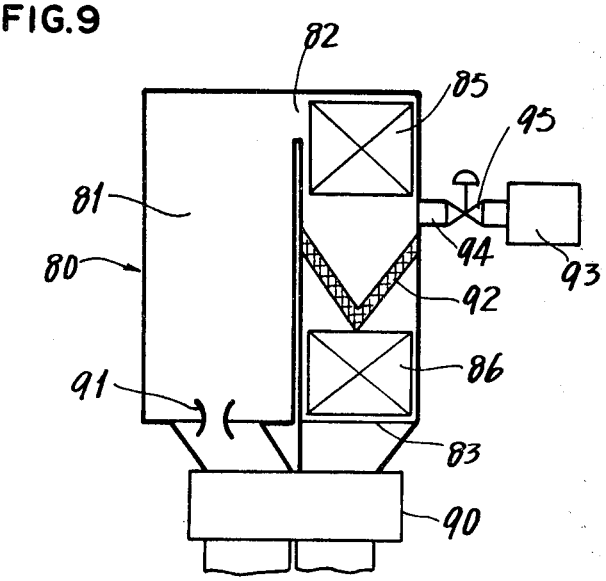
FIG. 9 is a longitudinal section showing a modification of the third embodiment.

The embodiment shown in FIG. 9 is approximately the same as that shown in FIG. 8 except that a denitrator 92 is disposed between a superheater 85 and a preheater 86 and consists of a denitrating catalyst layer which is V-shaped in cross section. Further, in order to control the combustion gas temperature at the position where the denitrator 92 is disposed, a high or low temperature gas source 93 is connected to a space between the superheater 85 and the denitrator through a supply duct 94, and a control valve 95 is placed between the ends of the supply duct 94.

The present invention is not limited to the illustrated embodiments and changes and modifications thereof may be made, and the technical scope of the invention should be judged from the appended Claims.

In addition, the denitrators 35, 87 and 92 consist mainly of denitrating catalyst layers, as described above. Thus, for example, in the case where denitration reaction is applied using $NH_3$ as a reductant as indicated in the formula shown at the outset, ammonia supply means is, of course, attached in addition to the denitrating catalyst layer. The reductant is not limited to ammonia and it is possible to use carbon monoxide, hydrogen gas, methane gas and other hydrocarbons, and mixtures thereof. In that case, means for supplying such gas will be attached. Further, instead of supplying such reductant from outside the combustion gas channel, it is possible to cause said reductant to be initially included in the combustion gas channel by incomplete combustion or any other suitable means, and in that case a denitrating catalyst layer alone is used.

As for the catalysts for denitration, in the case where ammonia is used as a reductant, there are those described in the U.S. patent application Ser. No. 699,472, which issued as U.S. Pat. No. 4,040,981 on Aug. 9, 1977, and modifications thereof, and in the case where other reductants are used, there are those described in the U.S. Pat. No. 3,939,097 and modifications thereof. However, the invention is not limited to those catalysts, and other catalysts known per se and catalysts of new compositions are applicable.

I claim:

1. In a boiler apparatus having a furnace and a plurality of heat exchangers disposed in a combustion gas channel between the furnace and boiler apparatus exits, the improvement comprising,
   a denitrator having a catalyst disposed in said combustion gas channel downstream of at least one of said heat exchangers,
   a bypass duct for said combustion gas channel connecting a first region thereof in which said denitrator is disposed with a second region upstream of said first region,
   control valve means disposed in said duct, and
   a temperature detector disposed in said first region and connected to said control valve means so as to control the opening and closing of said valve means in response to the temperature detected in said first region by said detector.

2. A boiler apparatus according to claim 1, wherein said second region is upstream of said one heat exchanger.

3. A boiler apparatus as set forth in claim 1, wherein said heat exchangers comprise at lease one superheater and primary economizer and secondary economizer, said denitrator being disposed between said primary and secondary economizers and said bypass duct communicating between the upstream and downstream sides of said secondary economizer.

4. A boiler apparatus as set forth in claim 1, wherein at least the portion of said combustion gas channel which includes said first region is divided into a plurality of divisional channels, and dampers are installed on the upstream and downstream sides of each divisional channel.

5. A boiler apparatus as set forth in claim 4, wherein said bypass duct comprises a divisional duct for each divisional channel, said control valve means comprises a divisional control valve for each bypass duct, the arrangement being such that at the time of operating said divisional control valves, the degree of opening of said dampers for opening and closing the divisional channels is adjusted in operative association therewith.

6. In a boiler apparatus having a furnace and a plurality of heat exchangers disposed in a combustion gas channel between the furnace and boiler apparatus exits, the improvement comprising,
   a denitrator having a catalyst disposed in said combustion gas channel downstream of at least one of said heat exchangers,
   a gas source providing means for providing additional gas the temperature of which is different from that of combustion gas in the region in which said denitrator is disposed,
   a duct communicating said gas source providing means to said region,
   a control valve disposed in said duct, and
   a temperature detector disposed in said region and connected to said control valve so as to control the opening and closing of said valve in response to the temperature detected in said region by said detector.

7. A boiler apparatus as set forth in claim 6, wherein said gas source providing means is a separate temperature raising furnace.

8. A boiler apparatus as set forth in claim 6, including means for maintaining said gas source providing means at a lower temperature than the temperature in said region.

9. A boiler apparatus as set forth in claim 6, wherein said gas source providing means is a means for taking in the atmosphere.

* * * * *